INVENTOR.
JOHN E. VANDER MEY

United States Patent Office 3,403,497
Patented Oct. 1, 1968

3,403,497
PROCESS AND APPARATUS FOR LIQUID/GAS
SEPARATION
John E. Vander Mey, Cresskill, N.J., assignor to Allied
Chemical Corporation, New York, N.Y., a corporation
of New York
Filed Mar. 11, 1966, Ser. No. 533,641
7 Claims. (Cl. 55—90)

ABSTRACT OF THE DISCLOSURE

A process and apparatus for separating a mist from a gas by contacting liquid streams with the gas. One liquid stream flows down the interior of the housing while a second liquid stream flows down the outer surface of a conical surface positioned within the housing. An inverted conical surface is positioned below the first conical surface. The inverted surface directs overly treated liquid to a central outlet. The process and apparatus are particularly adapted for use with sulfonators.

---

This invention deals generally with the separation of liquids from gases. More particularly, this invention deals with separating entrained small droplets of liquid (hereafter called mist) from a stream of gas.

The invention is particularly adapted for use with sulfonating apparatus, but may be used wherever it is desired to separate entrained mist from a gaseous stream which is flowing adjacent a liquid stream.

Typical reactions carried out in sulfonating apparatus involve the reaction of alkylated mononuclear aromatic compounds, such as dodecyl benzene, with sulfur trioxide to obtain alkylated mononuclear aromatic monosulfonates. The same apparatus can also be used for sulfating such compounds as lauryl and myristyl alcohol. Accordingly the term sulfonating as used hereafter refers also to sulfating.

Although there are many types of sulfonators with which this invention can be used, there are three basic types for use with which it was primarily designed. These are round tube, slot-shaped, and concentric sulfonators. In a round tube sulfonator an annular film of liquid to be treated flows down the inside wall of a pipe while treating gas (for example a mixture of air and sulfur trioxide) flows through the center of said annular film, thus contacting and treating the inside surface of the flowing liquid film. A slot-shaped reactor (sometimes called a flat tube reactor) differs from the round tube reactor only in that the cross-section of the flowing film in the former is that of a hollow elongated rectangle with the treating gas flowing through the hollow center thereof. In a concentric reactor there are two concentric annular flowing liquid films, one flowing on the inside wall of one pipe and the other flowing on the outside of a smaller central pipe, with the treating gas flowing through the hollow annulus between the two films.

All three types of sulfonators present the problem that the flowing treating gas entrains mist, made up of droplets of treated liquid, from the flowing liquid films. Since this treated-liquid mist is part of the product of the sulfonator, it is desirable to increase yield by separating the mist from the gas stream, which latter has become spent, i.e., has lost most of its capacity to further treat the liquid, as it nears the exit of the sulfonator apparatus.

Prior art separators for separating mist from a gas stream have been deficient in two major respects. They have contained surfaces from which the separated mist has not been properly removed, thus allowing oversulfonation of some of the separated mist resulting in a discolored and thus undesirable product. (Although the treating gas is referred to as a spent gas by the time it reaches the separator, it still contains a small amount of unreacted sulfur trioxide, which is sufficient to oversulfonate the mist if prolonged exposure is permitted.) Furthermore, they have failed to achieve a high degree of separation of mist, thus reducing yield.

This invention provides a process and apparatus particularly adapted to prevent contamination of the product liquid by discolored oversulfonated product mist.

This invention also provides a process and apparatus which will produce a high degree of separation of liquid from gas.

Broadly, the separator apparatus of this invention comprises an elongated hollow casing with two hollow conical baffles centrally positioned therein. The casing consists of a hollow frusto-cone open at the top and sloping outwardly and downwardly therefrom to an open base, a hollow cylinder attached to the perimeter of said open base and depending therefrom, and a plate, having two conduit outlets therethrough, closing the bottom end of said hollow cylinder and forming with the cylinder a shallow reservoir.

The two conical baffles are centrally positioned base to base one above the other inside the casing and axially aligned with the top opening thereof. The upper of the two baffles slopes outwardly and downwardly from an apex to a base, while the lower of the two baffles slopes inwardly and downwardly from the juncture of its base with the upper cone to an apex. A short flange, which can be merely a continuation of the upper conical baffle wall if desired, extends downwardly and preferably also outwardly from the juncture of the bases of the two conical baffles. The open end of a gas conduit is secured inside the casing just below and axially aligned with the apex of the lower conical baffle, and the conduit extends out through one of the conduit outlets in the plate. A liquid conduit originates below and to one side of said gas conduit and extends through the other conduit outlet in the plate.

In a second embodiment of the above-described apparatus, the two baffles are frusto-conical rather than conical, and a coolant pipe passes concentrically through the casing, the frusto-conical baffles, and the gas conduit. Each of the two frusto-conical baffles is attached at its small end to the coolant pipe and flares outwardly therefrom in the same manner as in the above-described first embodiment.

The process of the invention is briefly set forth below.

An annular film of product liquid coming from the sulfonator flows in the open top and down the inner wall of the casing, where it accumulates in the reservoir and flows out through the liquid conduit. Some of the liquid flowing down the conical upper portion of the inside of the casing drips onto and flows down the upper conical baffle and the short flange and drips off into the reservoir. Mist-carrying spent treating gas from the sulfonator flows into the separator through the center of the annular flowing liquid film and flows downwardly and outwardly through the annular passage formed between the inside wall of the frusto-conical casing and the outside wall of the upper conical baffle. A major portion of the mist from the gas condenses on and coalesces with the flowing film of liquid on the inside wall of the casing and with the flowing film of liquid on the outside wall of the upper conical baffle. The gas then flows downwardly and inwardly around the short flange, flows adjacent the outer wall of the lower conical baffle and into the gas conduit, passing therethrough out of the casing. A minor portion of the mist finds its way around the short flange and condenses on the outer surface of the lower conical baffle. (Due to the pattern of the gas flow around the flange, little or no mist deposits on its under side.) Since there is no flowing liquid film in the region of the lower conical baffle to flush the condensed mist away, the mist tends to oversulfonate, resulting in discoloration. The downward and inward slope of the lower conical baffle allows the force of gravity to channel the discolored mist to flow down to the apex of the baffle and drip off into the gas conduit, thus keeping the discolored mist separate from the product in the reservoir. The discolored mist and gas are separated by a conventional trap, and the gas is recycled.

The second embodiment of the separator functions in exactly the same manner, except that in it there is a second flowing annular film of product liquid coming into the separator from the sulfonator. This second film which is inward of and concentric with the first flows into the separator on the outside of the central coolant pipe and then spreads over the upper conical baffle and proceeds downward in the same manner as in the first embodiment of the separator.

As used in the claims the term conical is meant to encompass both conical and frusto-conical shapes. The term apex is used in the specification and claims to denote the smallest portion of either a cone or frusto-cone, and apex angle is used to denote the defining angle of either (i.e., in a frusto-cone, the apex angle of the cone of which the frusto-cone is a part). The term plate as used in the specification and claims is meant to encompass both curved and flat plates.

The advantages of this invention are obtainment of higher yield and of a lighter colored product than prior are separators.

In prior art separator designs no provision was made for separating the discolored oversulfonated product mist, which tends to collect in stagnant areas of the separator, from the product liquid. As a result the oversulfonated mist dripped into, mixed with, and discolored the product. A critical feature of the present invention is the provision of the lower conical (or frusto-conical, in the second embodiment) baffle which is downwardly and inwardly sloped so as to channel away to a separate collection point, by gravity, the oversulfonated mist which accumulates. The problem of discoloration of the product liquid is thus eliminated.

Most prior art separators have also failed to achieve a high degree of separation of mist from gas. In addition to solving the problem of liquid discoloration this invention also provides a high degree of separation of liquid from gas and thus a high product yield. One feature which contributes substantially to the high degree of separation is the flange depending from the juncture of the two conical baffles. This flange directs downwardly toward the reservoir most of the mist remaining in the gas after the gas has passed downwardly over the upper conical baffle.

Other and further advantages will be apparent to the reader from the following detailed description and drawings wherein.

Figure 1:
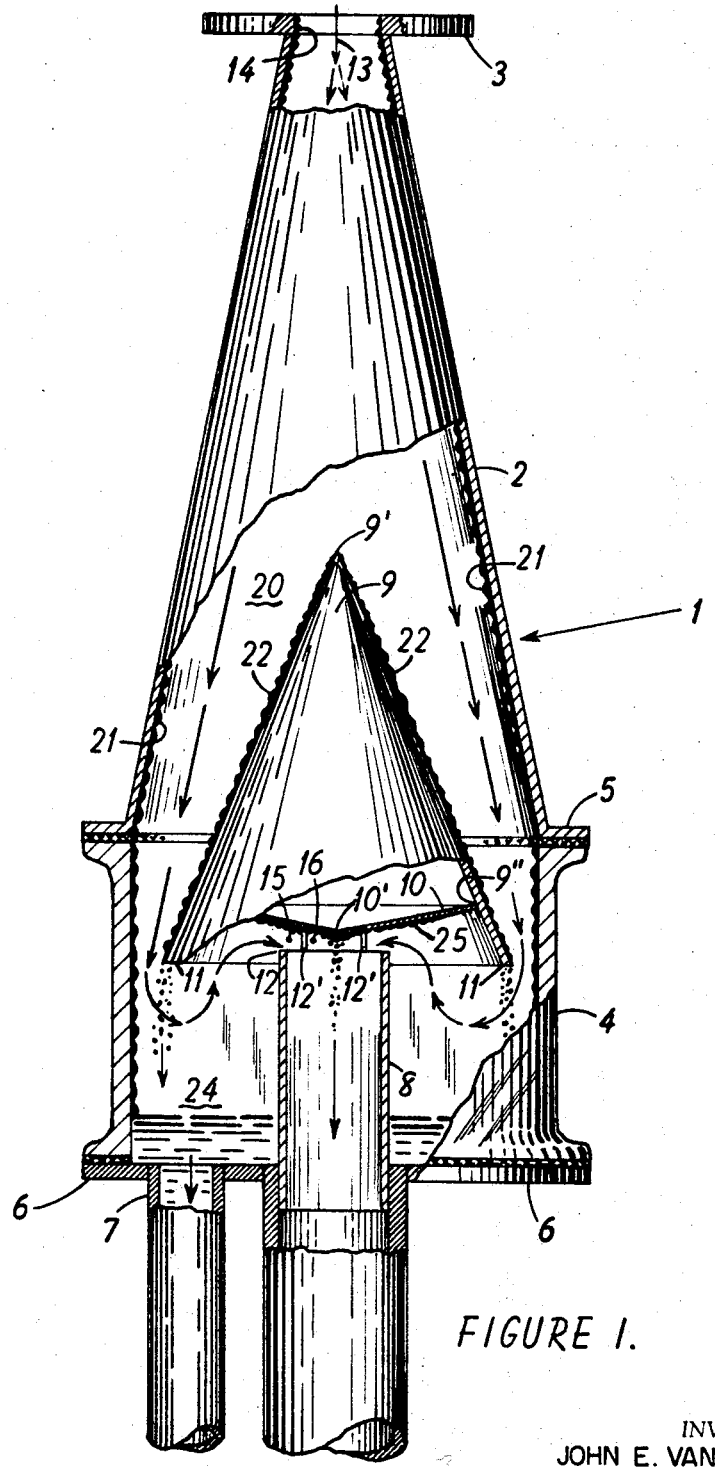
FIGURE 1 is a partial cross-sectional view of a first embodiment of the invention.
Figure 3:
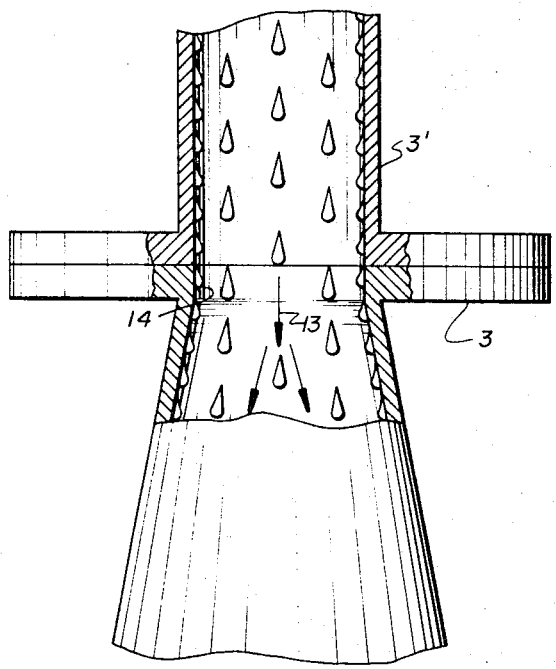
FIGURE 3 is a partial cross-sectional view showing the manner in which the separator of FIGURE 1 is attached to a sulfonator; the film flowing down the inside of the sulfonator and separator is schematically shown as droplets.

Referring more particularly to FIGURE 1, separator 1 is provided with a casing composed of a hollow frusto-cone 2, a hollow cylinder 4, and a plate 6. The frusto-cone 2 of the separator originates in an annular flange 3, shown connected to the bottom end 3′ of a round-tube type sulfonator (see FIGURE 3), and slopes outwardly and downwardly from its top to terminate in a lower annular flange 5. The hollow cylinder 4, which can be made of glass if observation of the process is desired, is attached by any conventional means (for example, bolts, not shown, extending between flange 5 and plate 6) between lower flange 5 and plate 6 which extends across the bottom end of hollow cylinder 4. The interior walls of hollow cylinder 4 and plate 6 define a liquid product reservoir 24. Extending through plate 6 from reservoir 24 are a liquid conduit 7 and a gas conduit 8, which will subsequently be described in further detail. Inside of hollow frusto-cone 2 is an upper hollow conical baffle 9 sloping downwardly and outwardly from an apex 9′. Secured at 9″ to the base of upper conical baffle 9 is the base of lower hollow conical baffle 10, which slopes downwardly and inwardly to an apex 10′. Preferably the apex angle of upper baffle 9 is an acute angle and the apex angle of lower baffle 10 is an obtuse angle. The lower wall of upper conical baffle 9 extends downwardly slightly beyond the base of lower conical baffle 10 so as to form a downwardly and outwardly sloping flange 11. However, the flange 11 can also be fabricated as a separate element and attached to the juncture of the conical baffles, if desired. Attached to the outer surface of conical baffle 10 at spaced points around its apex 10′ are supports 12′ for gas conduit 8. The supports 12′ are connected to gas conduit 8 at spaced points around its open top 12. Gas conduit 8 depends from the supports and extends out of the separator through plate 6. Open areas 15 and 16 between supports 12′ allow for entry of gas and oversulfonated liquid into open top 12 of gas conduit 8. The liquid conduit 7 originates at the bottom of reservoir 24 and extends out through plate 6 at a point at one side of gas conduit 12.

In use liquid product from the sulfonator enters the upper end of frusto-cone 2 at 14 in the form of an annular flowing film, flows at 21 down the inside walls of the frusto-cone 2 and hollow cylinder 4, collects in reservoir 24 and is drained off through liquid conduit 7. Some liquid also drops off the inside wall of frusto-cone 2 onto conical baffle 9 and flows down the surface of the baffle at 22 to drip off flange 11 into reservoir 24 and flow out through liquid conduit 7. Mist-carrying spent gas from the sulfonator enters frusto-cone 2 at 13 and flows through annular passage 20, which is formed by the inside of frusto-cone 2 and the outside of upper conical baffle 9, into hollow cylinder 4 from where the spent gas flows inwardly around flange 11 and through open areas 15, 16 into gas conduit 8, which is maintained at a lower pressure than the sulfonator so as to cause the gas to flow as described. A major portion of the mist from the gas condenses on flowing liquid product films 21, 22 on the inside of frusto-cone 2 and outside of first conical baffle 9, respectively. Condensation is aided by the fact that the separator is somewhat cooler than the sulfonator, since heat is evolved during sulfonation and very little sulfonation occurs in the separator. The major portion of the condensing mist coalesces with the liquid films 21, 22 flowing to the reservoir 24 and is flushed out through liquid conduit 7. A minor portion of mist finds its way around flange 11 and deposits at 25 on lower conical baffle 10. Because there is no flowing liquid stream on lower conical baffle 10 to rapidly flush this condensed mist away, the mist tends to over-react with the spent gas and for this reason the condensed mist is guided by the downward and inward slope of baffle 10 to flow toward and drip into the spent gas pipe 12. This is a critical feature, since the overreacted mist is discolored and would discolor the liquid product in the reservoir if allowed to mix with it. The spent gas and overreacted liquid product are separated by a conventional trap (not shown) and the spent gas is recycled to pick up fresh sulfur trioxide and be rerun through the sulfonation apparatus.

The separator shown in FIGURE 1 is the preferred design for use with a round tube sulfonator. However, the separator design of FIGURE 1 may also be used with a slot-shaped sulfonator if the separator design is modified so as to make frusto-cone 2, hollow cylinder 4, and baffles 9 and 10 oval if viewed in horizontal cross-section.

Figure 2:
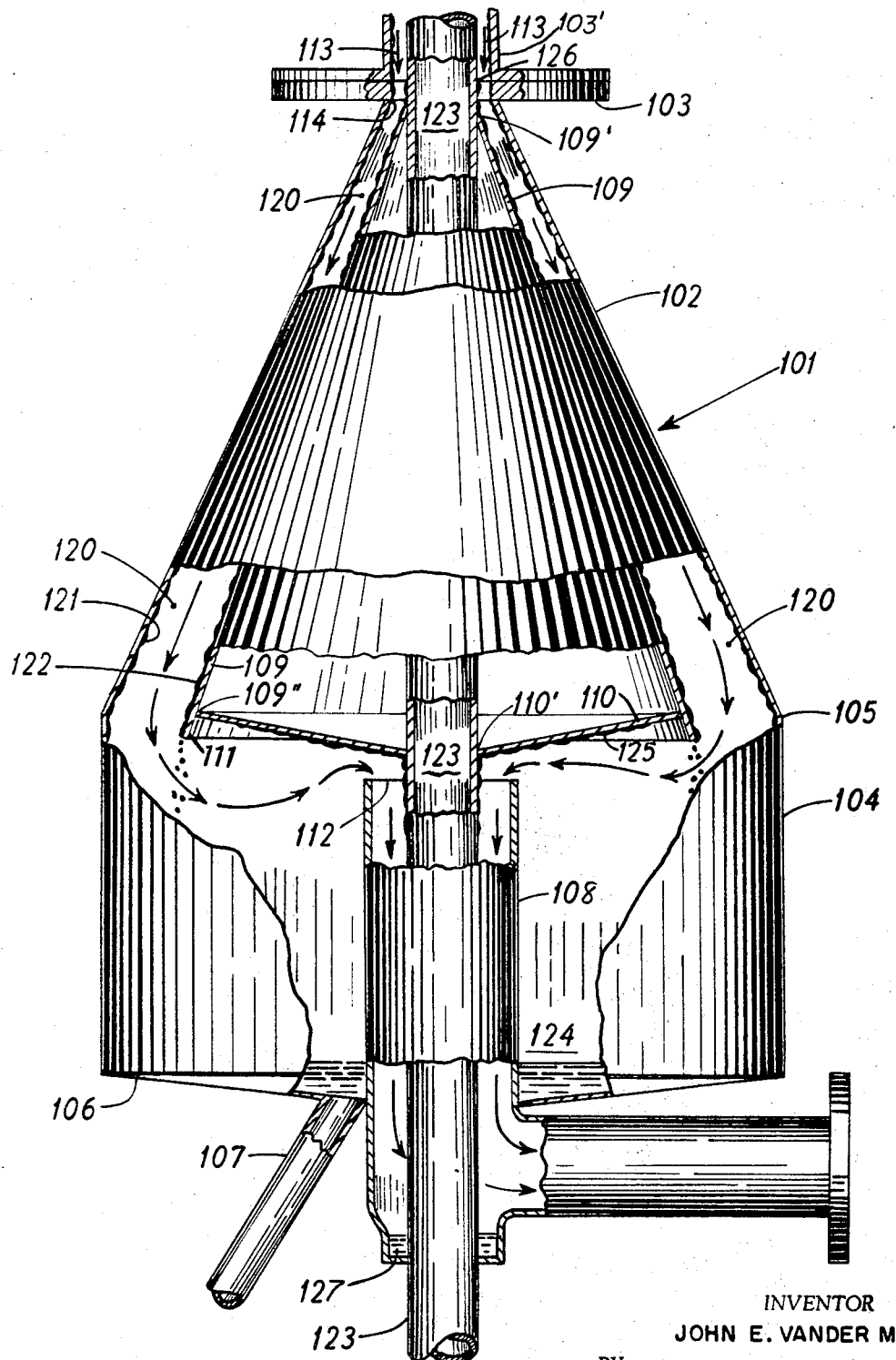
FIGURE 2 is a partial cross-sectional view of a second embodiment of the invention.

Referring now more particularly to FIGURE 2, separator 101 is provided with a casing composed of a hollow frusto-cone 102, a hollow cylinder 104, and a conical plate 106. The frusto-cone 102 of the separator originates in an annular flange 103, shown connected to the bottom end 103' of a concentric-tube type sulfonator, and slopes downwardly and outwardly therefrom. The hollow cylinder 104 is attached to (by conventional means such as welding) and depends from the base perimeter of frusto-cone 102, and conical plate 106 is attached in a similar manner to the bottom of hollow cylinder 104. The interior walls of hollow cylinder 104 and plate 106 define a liquid product reservoir 124. Extending through plate 106 are a liquid conduit 107 and a gas conduit 108, which will subsequently be described in further detail. Inside hollow frusto-cone 102 is an upper hollow frusto-conical baffle 109 sloping downwardly and outwardly from an apex 109' where it surrounds and joins by conventional means such as welding a coolant pipe 123, which runs concentrically through the separator casing. Secured at 109'' to the base of upper frusto-conical baffle 109 is the base of lower frusto-conical baffle 110, which slopes downwardly and inwardly to an apex 110' where it surrounds and joins coolant pipe 123. Preferably the apex angle of upper frusto-conical baffle 109 is an acute angle and the apex angle of lower frusto-conical baffle 110 is an obtuse angle. The lower wall of upper frusto-conical baffle 109 extends slightly beyond the base of lower conical baffle 110 so as to form a downwardly and outwardly sloping flange 111. Flange 111 can also be fabricated as a separate element and attached to the juncture of the conical baffles, if desired. Standing freely directly below the apex 110' of lower frusto-conical baffle 110 is the open top 112 of gas conduit 108, which extends out through and is secured to conical plate 106 at the bottom of the separator casing. Product collection conduit 107 originates at the bottom of reservoir 124 to one side of gas conduit 112 and extends out through conical plate 106. Previously mentioned coolant pipe 123 carrying a coolant such as water runs concentrically through the separator casing, frusto-conical baffles 109 and 110 and gas conduit 108, and cools the interior of the separator and thereby the flowing liquid films, so as to promote faster condensation.

In use of the separator, the liquid product enters the top of frusto-cone 102 from the sulfonator (not shown) at 114 in the form of a flowing annular film and flows down the inside wall of frusto-cone 102 and hollow cylinder 104 to collect in reservoir 124 and be drained off through liquid conduit 107. A second annular stream of liquid enters the separator from the sulfonator at 126 on the outside of coolant pipe 123 and flows down the outer surface of upper conical baffle 109 to drip off flange 111, collect in reservoir 124, and flow out through liquid conduit 107. Mist-carrying spent gas enters the separator from the sulfonator at annular top opening 113 formed between frusto-cone 102 and coolant pipe 123 and flows with decreasing velocity through the gradually enlarging annular passage 120 between the inside of frusto-cone 102 and the outside of upper frusto-conical baffle 109 into the reservoir 124 where the gas velocity drops still more and from where the spend gas stream flows inwardly around flange 111 and out through the open top 112 of gas conduit 108, which is maintained at a lower pressure than the sulfonator so as to cause the gas to flow as described. The major portion of mist from the gas coalesces with the liquid films 121 and 122 which are flowing to the reservoir 124. A minor portion of mist finds its way around flange 111 and deposits at 125 on second conical baffle 110. Because there is no flowing liquid stream in this region to flush this condensed mist away, the mist tends to overreact with the spent gas, oversulfonate and discolor, and for this reason is guided by the downward slope of baffle 110 so as to flow by gravity and drip into gas conduit 108 by way of open end 112. The spent gas and small amount of oversulfonated liquid product are separated by a conventional trap 127 (the outlet of which is not shown) and the gas is recycled to pick up fresh sulfur trioxide and be rerun through the sulfonation apparatus.

The separator shown in FIGURE 2 is the preferred design for use with a concentric tube sulfonator.

The preferred material for construction of the separator designs is stainless steel. Furthermore it has been found to be advantageous to coat all liquid-wetted surfaces of the separators with synthetic resin materials composed, for example, of silicone and/or tetrafluoroethylene resins. Such coatings provide surfaces to which the liquid product does not adhere and thus yield better flow characteristics.

The above disclosure and accompanying drawings are for purposes of description only and other embodiments and modifications will be apparent to those skilled in the art. Therefore my invention should be construed as limited only by the scope of the following claims.

I claim:
1. The process of separating mist from a spent, mist-carrying, gaseous sulfonating agent comprising:
   (a) flowing the mist-carrying gas through a hollow elongated separator zone,
   (b) flowing a first liquid film of sulfonated product down the inner surface of said separator zone to a reservoir,
   (c) flowing a second liquid film of sulfonated product to said reservoir on the outwardly and downwardly sloping outer surface of an upper conical baffle located in said separator zone,
   (d) condensing a major portion of the mist from said mist-carrying gas on said flowing liquid films as sulfonated product liquid,
   (e) condensing a minor portion of said mist on the surface of a lower inwardly and downwardly sloping conical baffle, located in said separator zone, as oversulfonated product liquid,
   (f) flowing said condensed minor portion of mist by gravity down the surface of said lower conical baffle to a collection point separate from said reservoir.
2. The process of claim 1 wherein coolant is passed through the center of said separator zone and said baffles.
3. In an apparatus comprising a sulfonator, wherein a gaseoue sulfonating agent is passed through a flowing annular film of liquid to be sulfonated, and a separator, wherein liquid mist entrained by said gaseous sulfonating agent is separated from said gaseous sulfonating agent, the improvement comprising a separator comprising:
   (a) an elongated hollow casing, the upper portion of which comprises a hollow cone open at the top and flaring downwardly and outwardly therefrom,
   (b) upper conical baffle means in said casing sloping downwardly and outwardly from an apex in said upper portion of said hollow casing to a base,
   (c) lower baffle means in said casing, adjoining to the base of said upper conical baffle means and sloping downwardly and inwardly therefrom to an apex, said lower baffle means functioning to collect on its surface oversulfonated material and channel said material away from sulfonated product material,
   (d) flange means extending downwardly from the juncture of said upper and lower baffle means so as to shield the lower baffle means and prevent deposition thereon of a major portion of sulfonated product mist,
   (e) said baffle means being substantially axially aligned with said casing,
   (f) conduit means of a diameter smaller than said lower baffle means, said conduit means having an open end positioned just below the apex of said lower baffle means and extending out of said separator, said conduit means receiving separated gas and condensed oversulfonated material,
   (g) a liquid conduit, originating below the level of the open end of said conduit means, connected to and leading from said separator casing.

4. The apparatus of claim 3 wherein the lower baffle means are conical and the flange means is short and annular.

5. The separator of claim 4 wherein the apex angle of the upper conical baffle means is an acute angle and the apex angle of the lower conical baffle means is an obtuse angle.

6. The separator of claim 4 wherein said upper and lower conical baffles and said conduit surround cooling means extending through said separator casing.

7. The separator of claim 4 wherein at least some of the interior surfaces are coated with a synthetic resin material to which liquid does not adhere.

References Cited

UNITED STATES PATENTS

| 588,825 | 8/1897 | Haas | 55—185 X |
| 2,452,859 | 11/1948 | Moody | 55—241 |
| 3,177,634 | 4/1965 | Latham et al. | 55—463 X |
| 3,228,174 | 1/1966 | Perry | 55—97 X |
| 3,246,026 | 4/1966 | Sowerby et al. | 55—36 X |
| 3,250,703 | 5/1966 | Levendusky | 55—97 X |

FOREIGN PATENTS 910,243 4/1954 Germany.

REUBEN FRIEDMAN, *Primary Examiner.*

J. ADEE, *Assistant Examiner.*